（12）United States Patent
Bauermeister

(10) Patent No.: US 7,788,581 B1
(45) Date of Patent: Aug. 31, 2010

(54) DYNAMIC CONTENT INSERTION

(75) Inventor: Benjamin Bauermeister, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 1212 days.

(21) Appl. No.: 11/369,523

(22) Filed: Mar. 7, 2006

(51) Int. Cl.
G06F 17/24 (2006.01)

(52) U.S. Cl. ...................................... 715/244

(58) Field of Classification Search ................. 715/518, 715/244
See application file for complete search history.

(56) References Cited

U.S. PATENT DOCUMENTS

| 4,751,740 A | 6/1988 | Wright |
| 6,725,424 B1 | 4/2004 | Schwerdtfeger et al. |
| 6,848,079 B2 | 1/2005 | Ito |
| 6,952,802 B2 | 10/2005 | Hardy |
| 7,028,256 B2* | 4/2006 | Altman et al. .............. 715/256 |
| 2002/0057451 A1* | 5/2002 | Ishijima .................... 358/1.15 |
| 2005/0097452 A1 | 5/2005 | Eross |
| 2005/0235202 A1 | 10/2005 | Chen et al. |
| 2005/0251443 A1* | 11/2005 | Chan et al. .................... 705/14 |
| 2005/0259279 A1 | 11/2005 | Ohyama et al. |
| 2007/0084915 A1* | 4/2007 | Yan et al. .................... 235/381 |

* cited by examiner

*Primary Examiner*—Doug Hutton
*Assistant Examiner*—Tionna Smith
(74) *Attorney, Agent, or Firm*—Robert C. Kowert; Meyertons, Hood, Kivlin, Kowert & Goetzel

(57) ABSTRACT

Techniques for dynamic content insertion are described, including converting an electronic document having content to a statically formatted electronic document having the content, extending an edge of the statically formatted electronic document to create an extended area, and inserting other content into the extended area.

28 Claims, 5 Drawing Sheets

DYNAMIC CONTENT INSERTION

FIELD OF THE INVENTION

The present invention relates generally to software. More specifically, dynamic content insertion is described.

BACKGROUND OF THE INVENTION

There are several conventional techniques to produce an electronic document. Some examples include text editors, word processors, spreadsheet programs, graphics programs, web editors, XLM editors, presentation editors, and integrated applications. However, each of these techniques suffers from the problem of creating non-portable documents. A non-portable document is platform dependent. A platform may refer to the hardware and operating system of a computing system. Some example platforms include: Sun Ultra™ 40 Workstation running Linux, the Hewlett Packard (HP) hardware running the HP version of UNIX (HPUX), and Intel® processor running Microsoft® Windows®. Thus, many platform dependent documents either cannot be viewed in different platforms or do not look the same from platform to platform.

Several electronic documents require a specific tool to view them. For example, many word processing files cannot be viewed without the specific word processing application in which the files were created. However, a user may wish to view a document without launching or executing an entirely new application or purchasing a new application. In contrast, statically formatted documents may be platform independent electronic documents. For example, a statically formatted document may be created in one platform or application, processed by a server using a second platform or application, and viewed in a third platform or application (hereafter application): That is, a statically formatted document may look the same wherever it is processed or viewed. For example, a static document may look the same whether it is placed on the world wide web, sent as an email attachment, or printed. Some conventional techniques embed advertisements in a document, which is undesirable to users attempting to preserve the appearance of their work, files, documents, graphics, or other work product. In other conventional examples, advertisements may be appended or attached to a document, but when printed, the advertisement also appears, reducing the usability and desirability for these conventional applications. A statically formatted document may be referred to as resolution independent. In some examples, a resolution independent document may be a statically formatted document configured to display in a substantially similar format, regardless of the native application being used. In other words, a resolution independent document appears the same independent of the resolution of the display program. Examples of statically formatted documents are documents formatted using Adobe® Portable Document Format (PDF).

There are multiple techniques of producing statically formatted documents. A first technique includes the use of a static formatting generator, such as Adobe® Acrobat® software, which allows the creation of statically formatted documents and the conversion of electronic documents to statically formatted electronic documents. A second way to convert documents to static formatting is to utilize an on-line web hosted static formatting generation, or conversion, service. The web hosted static formatting generation service allows a user to access a web site, submit an electronic document, and receive a statically formatted document in return. However, these techniques require a monetary commitment (e.g., subscription fee, one-time-pay-for performance, and the like). In some examples, the static formatting application requires an upfront investment (e.g., license fee, per-user or per-seat fee, and others). Some users may not have a need to use a static formatting generation service with sufficient volume to warrant the above-described financial commitments or other payment methods. Thus, what is needed is a method of producing a statically formatted document without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1:
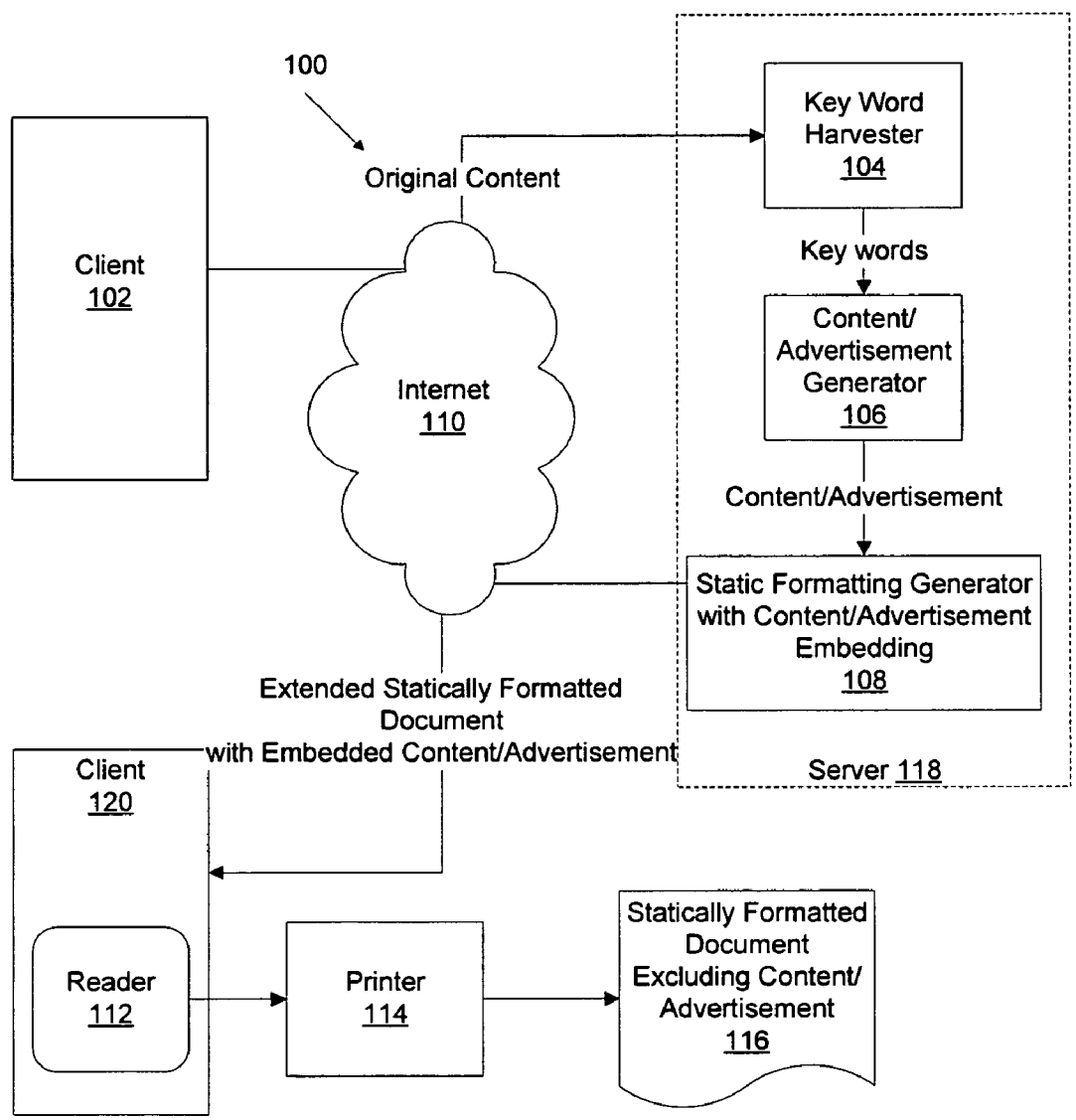
FIG. 1 illustrates an exemplary system for dynamic content insertion, in accordance with an embodiment.

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, the steps of disclosed processes may be performed in an arbitrary order, unless otherwise provided in the claims.

A detailed description of one or more embodiments is provided below with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Techniques for dynamic content insertion are described, including a method and system for converting a first electronic document to a statically formatted electronic document, the first electronic document comprising content (e.g., text, advertisements, graphics, video, audio, and others), extending an edge of the statically formatted electronic document to create an extended area, and inserting other content into the extended area. In some examples, a system for dynamic content insertion may include an electronic document converter configured to convert a first electronic document to a statically formatted document, a statically formatted document extender configured to extend the statically formatted document, and a content embedding module configured to insert content into the extended statically formatted document. In other examples, the described techniques may be implemented and performed differently and are not limited to the examples provided.

Statically formatted documents may be built using a page description language. In some examples, a page description language (PDL) may specify the arrangement of a printed page through commands from a computer that the printer carries out. In other examples, a PDL may be implemented and described differently. Examples of PDLs may include Hewlett Packard's Printer Control Language (PCL), IBM® Advanced Function Printing™ (AFP), and Adobe® Postscript® or Adobe Portable Document Format (PDF). PDLs may define page elements independently of printer technology, allowing the appearance of a page to be consistent regardless of the specific printer or viewer used.

A statically formatted document may also be referred to as a resolution independent document. Display of resolution independent documents may not be affected by the user monitor size or resolution settings. That is, resolution independent documents may look the same from one monitor resolution to another. In contrast, a web page is one example of a resolution dependent file. A web page may be subject to the number of useable pixels or "live space" on a browser window. Several factors may affect the browser window "live space", some of which may include monitor size, resolution, browser type, operating system, and user preferences. That is, a web page, or resolution dependent file, may look different on each user system, as each user system may have different hardware, software, and user preferences. Even the use of desktop publishing tools, such as style sheets, may not be able to override the user's selected browser display characteristics, and thus, may not be able to predict the way a web page will display. In some implementations, statically formatted documents, or resolution independent documents embed font characteristics (e.g., font, font style, scaling, color, and the like) within the file to remain independent of user monitor resolution and/or display settings.

FIG. 1 illustrates an exemplary system 100 for dynamic content insertion, in accordance with an embodiment. In general, a user may utilize a web hosted static formatting generator that may, in lieu of making a purchase of either an application or web services, insert content (e.g., advertisements, promotions, instructions, coupons, graphics, text, and the like) into the converted documents. The revenue from the content generation may replace the user purchases. For example, advertisers may pay placement or similar fees to have advertisements embedded in converted documents. This eliminates the burden on the user to pay for the use of a service or application to create a statically formatted document. Instead, payment for the use of a static formatting generator (either as a hosted service (e.g., ASP) or as a standalone native application on a desktop or laptop) is eliminated and the user does not set forth a payment. Instead, the advertiser pays to place an advertisement before a user (i.e., as an inserted document in an extended area of a statically formatted document or resolution independent document (as further described below)).

In some embodiments, client 102 may send or submit a raw document, or content, over the internet 110 to a server 118. In some embodiments, client 102 may use a web browser to connect to and communicate with server 118. Server 118 may be configured to host keyword harvester 104, content/advertisement generator 106, and static formatting generator with content/advertisement embedding 108. Hosting, in general, may refer to a system on the internet that provides data to a client or a remote terminal. Here, hosting may refer to providing the hardware, software, and communications lines for the server allowing the server to provide a specific service of static formatting to remote clients. Keyword harvester 104 may parse the content and harvest known keywords. Parsing may refer to dividing up or separating a document into smaller parts for the purpose of analysis. In other words, the content of a document may be divided up and analyzed so that it may be searched for keywords. The keywords may have been preset to correlate to a content engine or an advertisement engine. That is, the keywords searched for by keyword harvester 104, may be the same keywords configured in content/advertisement generator 106. The keywords may be forwarded to content/advertisement generator 106, which may retrieve content/advertisements that correlate to the harvested keywords. In some embodiments, forwarding the keywords to content/advertisement generator 106 may take the form of a query or request. In some embodiments, an application server included in server 118 may receive the request, convert the request to a query, and send the query to content/advertisement generator 106. Retrieving the content/advertisements may include executing the query. In some embodiments, content/advertisement generator 106 may include a content/advertisement database that may associate keywords with particular content/advertisements and may retrieve the content/advertisements upon receipt of a query requesting content/advertisements associated with the keywords. That is, a keyword and a content/advertisement may share a record in a content/advertisement database included in content/advertisement generator 106. In some embodiments, keyword harvester 104 and/or content/advertisement generator 106 may be hosted on one or more other servers, or may be performed by a third party entity. The content and the advertisements may be forwarded to static formatting generator with content/advertisement embedding 108. Static formatting generator with content/advertisement embedding 108 may convert the raw (i.e., original, electronic) document, or original content included in an electronic document, to a statically formatted document, or resolution independent document, and may insert the content/advertisements (hereafter "advertisements"). The process of inserting content may also be referred to as embedding, adding, including, appending, or placing. In some embodiments, the same content/advertisement may be inserted on multiple pages. In other embodiments, different advertisements may be inserted on different pages of the same statically formatted document based on the keywords harvested from each page. In still other embodiments, an advertisement may be inserted on the first and/or last page of a multiple-page statically formatted document. In yet other examples, advertisements may be inserted differently and are not limited to the examples described above.

The extended statically formatted document with embedded content/advertisements may be sent via internet 110 to client 120. In some embodiments, the extended statically formatted document with embedded content/advertisements may be returned to client 102 via internet 110. Client 102 may send the extended statically formatted document with inserted content/advertisements to client 120 and/or other clients (not shown). The sending may utilize an available computer method, such as, attaching the statically formatted document to an email message. Client 120 may use reader 112 to view the extended statically formatted document and the embedded content/advertisements. Reader 112 may be an application, specifically programmed to read statically formatted documents. Reader 112, may be sent with the statically formatted document. As an example, Adobe® Acrobat® Reader® developed by Adobe Systems Incorporated of San Jose, Calif. may be used to view the statically formatted document, as described above. In other examples, different readers may be used.

Client 120 may use reader 112 to send a print request to printer 114. In some embodiments, a request may be a message, command, or other input (e.g., user, system, default-specified, or other) that, when received, initiates or triggers a responsive action, message, command, action, or data to be sent. Here, a request may be initiated to print the statically formatted document. The request may come in the form of a user input such as from an application menu item or a keyboard print screen button. The application may send the request to a printer driver. In general, a printer driver is an application (e.g., an applet, script, program, or the like) that translates the data into a format that the printer can understand. Here, the printer driver may be advertisement-aware. That is, the printer driver may be configured to exclude or omit the extended area from the printout when an inserted advertisement in an extended area of a statically formatted document is detected. In some embodiments, the statically formatted document may include an embedded printer script which may be configured to instruct the printer to omit the extended area. Printer 114 may print the statically formatted document omitting the extended area and inserted advertisements, thus maintaining the content from the original (i.e., first, unconverted, raw) electronic document in its original size.

Figure 2A:
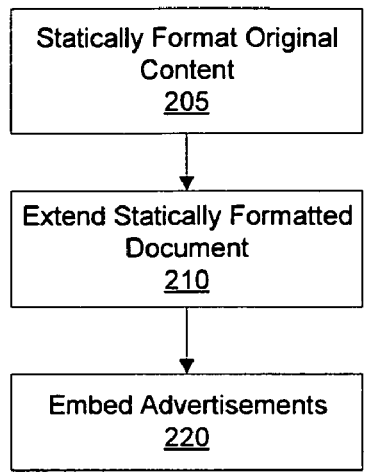
FIG. 2A illustrates an exemplary process for dynamic content insertion, in accordance with an embodiment.

FIG. 2A illustrates an exemplary process for dynamic content insertion in accordance with an embodiment. The content may be statically formatted in process action 205. In some embodiments, the content may be electronically transferred to a web-hosted static formatting generator for formatting. The statically formatted document may be extended in process action 210. That is, one or more document edges may be expanded or extended. For example, two inches of space may be added or appended to the bottom edge of the document such that if the original document possessed 8.5×11 inches of space, the extended document may possess 8.5×13 inches of space. That is, the extension area may abut an edge of the statically formatted document. In some examples, abut refers to lying adjacent or touching at one end. Therefore, the extension area may touch or lie adjacent to the original document at one end. The extension process may be performed on the top, bottom, left, or right edge of the statically formatted document. In some embodiments, the extension process may involve a plurality of edges and the extension area may vary in size. That is, more or less extension area may be created depending on the size, quantity, or other characteristics of the advertisements. The advertisements may be embedded, or placed into the extended statically formatted document in process action 220. In some embodiments, the formatting process also embeds tags into the extended statically formatted document to identify the content from the first or original electronic document and the content in the extended statically formatted document. These tags may be used by other operations or applications.

Figure 2B:
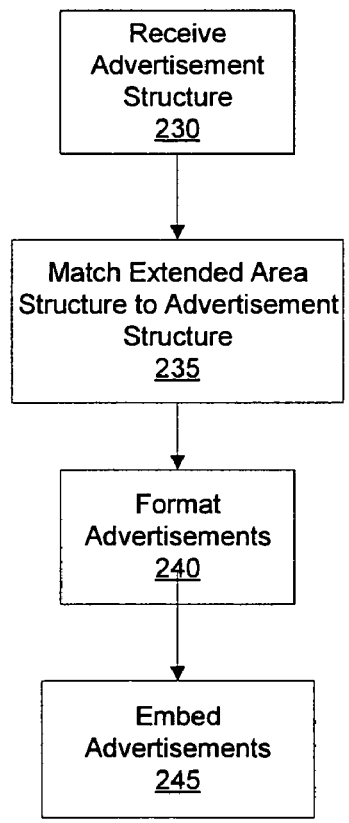
FIG. 2B illustrates an exemplary process for embedding advertisements, in accordance with an embodiment.

FIG. 2B illustrates an exemplary process for embedding advertisements, in accordance with an embodiment. The advertisements may be received in process action 230. In some embodiments, the advertisements may be received over the interne. In other embodiments, the advertisements may be received in one of a set of data structures such as packets, segments, frames, or the like. That is, the number, content, and approximate size of the advertisements may be transferred in one of a set of established data structures. For example, one group of advertisements may include two graphic-based (icons) and two text-based advertisements. The advertisements may be received in a four-element advertisement data structure identifying two texts elements and two graphical elements. The advertisement data structure may be matched (i.e., compared) to a data structured belonging to a group of extended area data structures in process 235. That is, upon receiving the advertisements, the advertisement data structure may be evaluated to reveal information associated with the advertisement and the appropriate extended area data structure may be selected. In some embodiments, the advertisements may be received in a packet or other format that may identify advertisement content and a structure associated with the content by placement of the information in the packet. That is, a bit position in the packet may determine the number of advertisements; another bit position or positions in the packet may determine a size of each ad; yet another bit position may determine advertisement type. In other embodiments, the bit positions may be used to determine other characteristics of an advertisement or its location when inserted into a statically formatted document. Upon receiving this information and making the comparison the appropriate extended area structure may be selected. The advertisements may be formatted in process action 240. The formatting may involve parameters associated with each ad, or for each component in an ad. For example, one element of the advertisement structure may include an icon, while another element may include text. Each element may be formatted using different formatting values and/or parameters. More specifically, if one element of the advertisement structure includes a hyperlink, the hyperlink may be given the color of blue while the other items in the element, such as other text, may be another color, font or other display feature. Graphical elements may have yet another formatting. The advertisements may be embedded into the extended structure in process action 245. In some embodiments, content other than advertisements, such as comments, graphics, text, promotions, coupons, or instructions or the like, may be inserted in the extended structure.

Figure 2C:
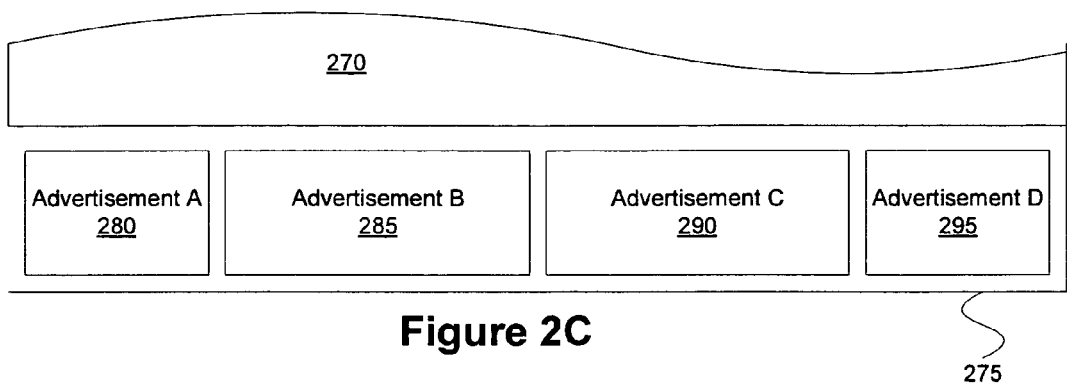
FIG. 2C illustrates an exemplary extended area structure, in accordance with an embodiment.

For example, FIG. 2C illustrates an exemplary extended area structure 275 of statically formatted document 270, in accordance with an embodiment. Extended area 275 abuts the edge of statically formatted document 270. Extended area structure 275 includes advertisement A 280 and advertisement D 295 of one size, and advertisement B 285 and advertisement C 290 of a larger size. This extended area structure may be selected to correlate with an advertisement structure or packet that includes two larger and two smaller advertisements. Other extended area structure may have a plurality of advertisements of differing sizes.

Figure 3:
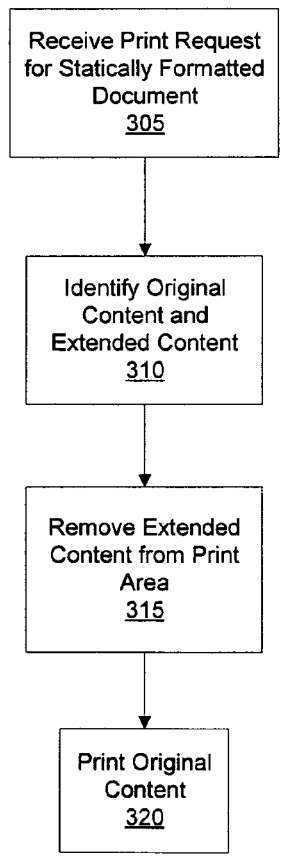
FIG. 3 illustrates and exemplary process for printing a statically formatted document with inserted content, in accordance with an embodiment.

FIG. 3 illustrates and exemplary process for printing a statically formatted document with inserted content, in accordance with an embodiment. A print request for the statically formatted document may be received in process action 305. In some embodiments, a request may be a message, command, or other input (e.g., user, system, default-specified, or other) that, when received, initiates or triggers a responsive action, message, command, action, or data to be sent. Here, a request may be initiated to print the statically formatted document. The print request may be initiated by the selection of the Print Screen keyboard key. In some embodiments, the print request may be initiated via a user selecting a printing control element within a reader application that may be viewing the statically formatted document. The application may send the request to a printer driver. In general, a printer driver translates the data into a format that the printer can understand. Here, the printer driver may be advertisement-aware. That is, the printer driver may be configured to exclude or omit the extended area from the printout. The content of the original or first electronic document may be identified and the content in the extended area may be identified in process action 310. In some embodiments, the identification process may utilize tags in the statically formatted document to identify the content in the original or first electronic document and the content in the extended statically formatted document. That is, the static formatting process may tag the content upon conversion or creation of the statically formatted document and add or embed those tags in the document for later use. The content in the extended area may be removed from the document print area in process action 315. For example, content in the original or first electronic document may fill an 8.5×11 inch page and have an extension area of two inches across the bottom edge of the statically formatted document such as electronic view of the statically formatted document 405 in FIG. 4A. This document may have a printout of an 8.5×11 inch page containing the content, such as shown by the printout of the statically formatted document 420 in FIG. 4B. The extension area adds space to the document for viewing, but the added space is neither printed, nor does it affect the printout of the content. That is, the content is not shrunk, moved, or compressed, and may be printed at 100% of its original size.

Some printer drivers may be configured to warn users of content that will not be printed. In some embodiments, the printer driver may be configured to disable these warnings, such that the user may not receive a warning concerning content not being printed each time a statically formatted document having an inserted advertisement is printed. The content in the static format may be printed in process action 320. In some embodiments, the printing instructions may be included in a printer driver, which may be referred to as an advertisement-aware printer driver. In other embodiments, the printing instructions may be included in a printing script embedded into the statically formatted document during processing.

Figure 4B:
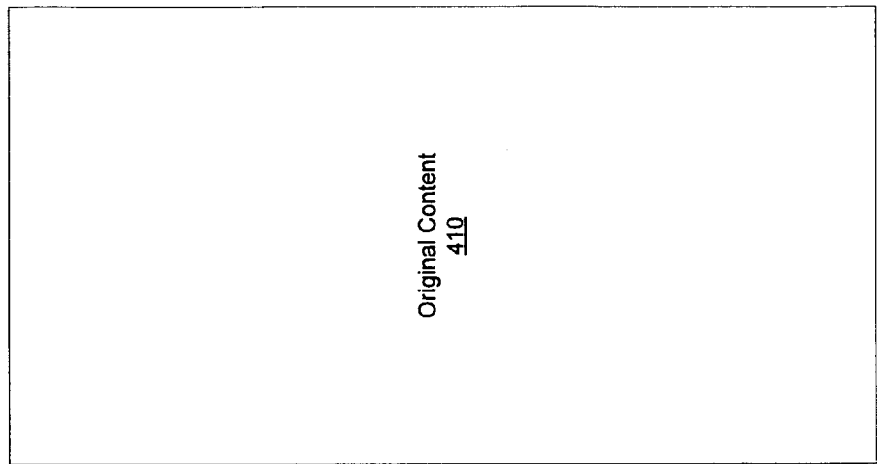
FIG. 4B illustrates an exemplary print out of an extended statically formatted document, in accordance with an embodiment.
Figure 4A:
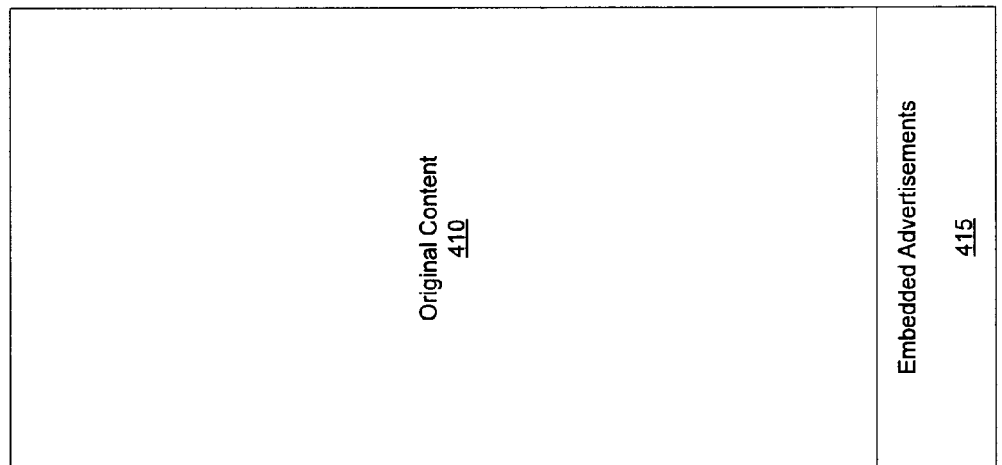
FIG. 4A illustrates an exemplary electronic view of an extended statically formatted document, in accordance with an embodiment.

FIG. 4A illustrates an exemplary electronic view of an extended statically formatted document, in accordance with an embodiment. View of the extended statically formatted document 405 includes original content (i.e., content from an original or first electronic document) 410 and embedded advertisements 415. The user may view the document with embedded advertisements in the electronic view 405. Viewing the statically formatted document may occur with a reader application. This illustration shows the extended area and embedded advertisements below the bottom edge of the statically formatted document, however, the extended area and embedded advertisements may be located in one or more of the top, left, or right edges as well. In some embodiments, the extended area and advertisements may be located on a plurality of edges.

FIG. 4B illustrates an exemplary print out of an extended statically formatted document, in accordance with an embodiment. Printout of the extended statically formatted document 420 includes original content 410. Printout 420 is lacking the embedded advertisements. That is, the print out of the extended statically formatted document does not include the advertisements such that the original content may be printed in its 100% size. Users of the service may need to create a statically formatted document, but may not want the advertisements to distract from the message of their document. For example, a user may need to create a legal document that must be signed and recorded. The user may wish to use static formatting to ensure the layout of the document, however, having advertisements in the printout may not be acceptable in this instance. The printout provides an advertisement free version of the statically formatted document to users.

Figure 5:
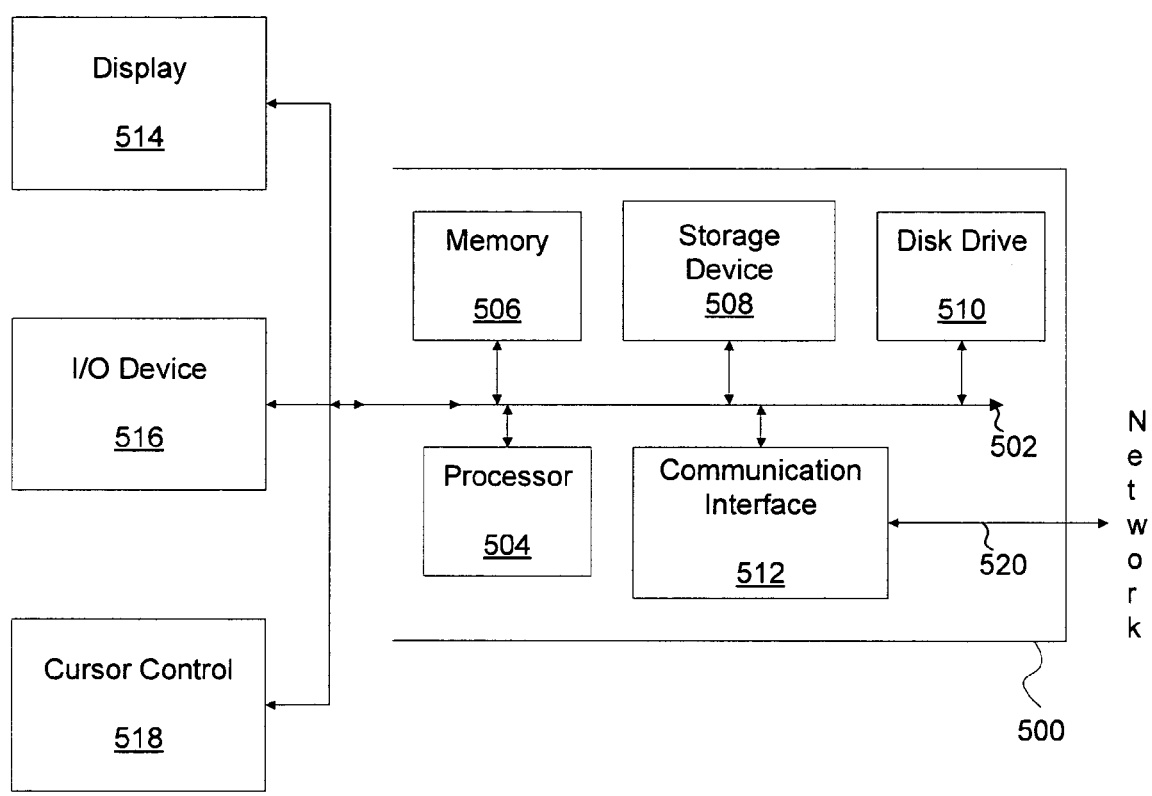
FIG. 5 illustrates and exemplary system in which dynamic content insertion may take place, in accordance with an embodiment.

FIG. 5 illustrates and exemplary system in which dynamic content insertion may take place, in accordance with an embodiment. In some embodiments, computer system 500 may be used to implement computer programs, applications, methods, or other software to perform the above-described techniques for fabricating storage systems such as those described above. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some embodiments of the invention, computer system 500 performs specific operations by processor 504 executing one or more sequences of one or more instructions stored in system memory 506. Such instructions may be read into system memory 506 from another computer readable medium, such as static storage device 508 or disk drive 510. In some embodiments, hard-wired circuitry may be used in place of or in combination with software instructions to implement the invention.

The term "computer readable medium" refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments of the invention, execution of the sequences of instructions to practice the invention is performed by a single computer system 500. According to some embodiments of the invention, two or more computer systems 500 coupled by communication link 520 (e.g., LAN, PSTN, or wireless network) may perform the sequence of instructions to practice the invention in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
   receiving an electronic document from a client over a network, wherein the document comprises content and wherein the document is not statically formatted;
   converting the electronic document to a statically formatted electronic document having the content, wherein said converting comprises:
      extending an edge of the statically formatted electronic document to create an extended area;
      determining an advertisement dependent on the content;
      formatting the advertisement for the extended area; and
      inserting the formatted advertisement into the extended area; and
   sending the statically formatted document including both the content and the advertisement to the client over the network,
   wherein the format of the statically formatted document is independent of an application used to display the statically formatted document.

2. The method of claim 1, wherein the extended area abuts a top edge of the statically formatted electronic document.

3. The method of claim 1, wherein the extended area abuts a bottom edge of the statically formatted electronic document.

4. The method of claim 1, wherein the extended area abuts a right edge of the statically formatted electronic document.

5. The method of claim 1, wherein the extended area abuts a left edge of the statically formatted electronic document.

6. The method of claim 1, wherein the statically formatted electronic document comprises one or more pages.

7. The method of claim 6, wherein the one or more pages has another extended area including the formatted advertisement.

8. The method of claim 1, wherein the formatted advertisement is associated with one or more keywords within the content.

9. The method of claim 1, wherein the converting the electronic document further comprises configuring the statically formatted electronic document to print without the extended area and the formatted advertisement.

10. The method of claim 1, wherein inserting the formatted advertisement further comprises:
    receiving the advertisement in a data structure;
    comparing an extended area data structure to the data structure;
    formatting the advertisement based on a result of the comparing, including applying a font, a font size, scaling, and a color to generate the formatting advertisement; and
    inserting the formatted advertisement into the extended area data structure.

11. The method of claim 1, wherein the statically formatted electronic document is formatted in portable document format.

12. A computer readable storage medium storing computer instructions executable by a processor to implement:
    receiving an electronic document from a client over a network, wherein the document comprises content and is not resolution independent;
    converting the electronic document to a resolution independent document, the resolution independent document having content from the electronic document, wherein said converting comprises:
       extending an edge of the resolution independent document to create an extended area;
       receiving one or more advertisements;
       formatting the one or more advertisements for the extended area; and
       inserting the one or more advertisements, after formatting, into the extended area; and
    sending the resolution independent document including both the content and the one or more advertisements to the client over the network,
    wherein the format of the resolution independent document is independent of a display resolution of an application used to display the resolution independent document.

13. The computer readable storage medium program product of claim 12, wherein the extended area abuts a top edge of the resolution independent document.

14. The computer readable storage medium program product of claim 12, wherein the extended area abuts a bottom edge of the resolution independent document.

15. The computer readable storage medium program product of claim 12, wherein the extended area abuts a right edge of the resolution independent document.

16. The computer readable storage medium program product of claim 12, wherein the extended area abuts a left edge of the resolution independent document.

17. The computer readable storage medium program product of claim 12, wherein at least one of a plurality of pages in the resolution independent document has the extended area including the one or more advertisements.

18. The computer readable storage medium program product of claim 12, wherein the one or more advertisements located in the extended area of a page of the resolution independent document correlates to one or more keywords within the content.

19. The computer readable storage medium program product of claim 12, wherein the converting the electronic document to the resolution independent document further comprises configuring the resolution independent document to print without the extended area and the one or more advertisements.

20. The computer readable storage medium of claim 12, wherein inserting the one or more advertisements comprises:
    receiving the one or more advertisements in a data structure;
    matching the extended area data structure to the data structure;
    formatting the one or more advertisements, the formatting including applying a font, a font size, scaling, and a color; and
    inserting the one or more advertisements, after formatting, into the extended area data structure.

21. A system, comprising:
    a processor coupled to memory, wherein the memory stores program instructions executable by the processor to implement:
       an electronic document converter configured to:
          receive a first electronic document wherein the first electronic document is not resolution independent, is received from a client over a network, and comprises content, and
          convert the first electronic document into a second electronic document, wherein the second electronic document is resolution independent and comprises the content;
       an extender configured to extend an area of the second electronic document; and a content embedding module configured to:
  determine an advertisement dependent on the content and
  format the advertisement for the extended area; and
  insert the formatted advertisement into the extended area in the second electronic document
  wherein the format of the second electronic document is independent of a display resolution of an application used to display the second electronic document.

22. The system of claim 21, wherein the content embedding module is further configured to embed a printing script into the second electronic document, the printing script being configured to print the second electronic document without the extended area and the inserted advertisement.

23. The system of claim 21, wherein the inserted advertisement correlates to one or more keywords associated with the first electronic document.

24. The system of claim 21, wherein the second electronic document is formatted in a portable document format.

25. A computer readable storage medium storing computer instructions executable by a processor to implement:
  receiving a first electronic document from a client over a network, wherein the first electronic document is not statically formatted;
  converting the first electronic document to a statically formatted electronic document, the first electronic document comprising content shared with the statically formatted electronic document wherein said converting comprises:
    extending an edge of the statically formatted electronic document to create an extended area;
    determining one or more advertisements dependent on the content;
    formatting the one or more advertisements for the extended area; and
    inserting the formatted one or more advertisements into the extended area; and
  sending the statically formatted document including both the content and the formatted one or more advertisements to the client over the network,
  wherein the format of the statically formatted document is independent of an application used to display the statically formatted document.

26. The computer readable storage medium program product of claim 25, wherein the converting the electronic document further comprises configuring the statically formatted electronic document to print without the extended area and the formatted one or more advertisements.

27. A method comprising:
  receiving an electronic document from a client over a network, wherein the document comprises content and wherein the document is not statically formatted:
  converting the electronic document to a statically formatted electronic document having the content, wherein said converting comprises:
    extending an edge of the statically formatted electronic document to create an extended area;
    determining an advertisement dependent on the content;
    formatting the advertisement for the extended area; and
    inserting the formatted advertisement into the extended area; and
  sending the statically formatted document including both the content and the advertisement to the client over the network, wherein the format of the statically formatted document is independent of an application used to display the statically formatted document;
  receiving the statically formatted electronic document having an extended area with the embedded advertisement formatted for the extended area;
  displaying the statically formatted electronic document including the content and the embedded advertisement;
  printing the statically formatted document including the content and without the extended area and embedded advertisement.

28. The method of claim 27, wherein the embedded advertisement correlates to one or more keywords in the statically formatted electronic document.

* * * * *